(12) United States Patent
Kayser et al.

(10) Patent No.: US 12,555,266 B2
(45) Date of Patent: Feb. 17, 2026

(54) SHAPE COMPLETION AND OBJECT POSITION ESTIMATION FOR MACHINE VISION

(71) Applicant: Robert Bosch GmbH, Stuttgart (DE)

(72) Inventors: Matthias Kayser, Karlsbad (DE); Mengkejiergeli Ba, Shanghai (CN); Shishir Reddy Vutukur, Riegelsberg (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 18/046,311

(22) Filed: Oct. 13, 2022

(65) Prior Publication Data
US 2023/0124868 A1    Apr. 20, 2023

(30) Foreign Application Priority Data
Oct. 18, 2021    (DE) ..................... 10 2021 211 741.4

(51) Int. Cl.
G06T 7/73    (2017.01)
(52) U.S. Cl.
CPC ...... *G06T 7/75* (2017.01); *G06T 2207/10028* (2013.01); *G06T 2207/20081* (2013.01); *G06T 2207/20084* (2013.01)
(58) Field of Classification Search
None
See application file for complete search history.

(56) References Cited

U.S. PATENT DOCUMENTS

| 2023/0077856 A1* | 3/2023 | Irshad | G06T 7/70 |
| | | | 702/94 |
| 2023/0169677 A1* | 6/2023 | Ilic | G06T 7/73 |
| | | | 382/103 |
| 2024/0028792 A1* | 1/2024 | Irshad | G06T 7/50 |
| 2024/0104830 A1* | 3/2024 | Yin | G06T 15/04 |

FOREIGN PATENT DOCUMENTS

WO    2021/164887 A1    8/2021

OTHER PUBLICATIONS

Drost et al., "Model Globally, Match Locally: Efficient and Robust 3D Object Recognition," Conference on Computer Vision and Pattern Recognition (CVPR), 2010, p. 998-1005 (8 pages).
Qi et al., "PointNet++: Deep Hierarchial Feature Learning on Point Sets in a Metric Space," Advances in Neural Information Processing Systems (NIPS 2017). pp. 1-14 (14 pages).
Sundermeyer et al., "Implicit 3D Orientation Learning for 6D Object Detection from RGB Images", European Conference on Computer Vision (ECCV), 2018, p. 712-729 (17 pages).
(Continued)

*Primary Examiner* — Andrew H Lam
(74) *Attorney, Agent, or Firm* — Maginot, Moore & Beck LLP

(57) ABSTRACT

A computer-implemented method for machine vision includes generating, by an artificial neural network, a 6D position estimate of an object and a shape completion estimate of the object based on a partial point cloud. The partial point cloud including a set of 3D points representing the object. The artificial neural network trained using at least one digital geometry model of the object, in particular, at least one CAD model of the object.

15 Claims, 3 Drawing Sheets

(56) References Cited

OTHER PUBLICATIONS

Park et al., "DeepSDF: Learning Continuous Signed Distance Functions for Shape Representation," Conference on Computer Vision and Pattern Recognition (CVPR), 2019, p. 165-174 (10 pages).
Park et al., "Pix2Pose: Pixel-Wise Coordinate Regression of Objects for 6D Pose Estimation," International Conference on Computer Vision (ICCV), Oct. 2019 (2019), p. 7668-7677 (10 pages).
Xu et al., "W-PoseNet: Dense Correspondence Regularized Pixel Pair Pose Regression," CoRR, arXiv.1912.11888[cs.CV], Mar. 4, 2021 (2021) (7 pages).
Yuan et al., "3D Shape Completion and Canonical Pose Estimation with Structured Neural Networks," The Robotics Institute: Carnegie Mellon University, May 2019 (2019), pp. 1-60 (65 pages).
Goforth et al., "Joint Pose and Shape Estimation of Vehicles from LiDAR Data," arXiv:2009.03964v, Sep. 8, 2020 (2020) (10 pages).
Gu et al., "Weakly-Supervised 3D Shape Completion in the Wild," European Conference on Computer Vision—ECCV, vol. 12350, arXiv.2008.09110v, Oct. 29, 2020 (2020), pp. 1-11 (28 pages).

\* cited by examiner

SHAPE COMPLETION AND OBJECT POSITION ESTIMATION FOR MACHINE VISION

This application claims priority under 35 U.S.C. § 119 to patent application no. DE 10 2021 211 741.4, filed on Oct. 18, 2021 in Germany, the disclosure of which is incorporated herein by reference in its entirety.

The disclosure relates generally to the technical field of machine image processing, in particular for machine vision, and especially to a computer-implemented method for generating, by an artificial neural network, a 6D position estimate of an object and a shape completion estimate of the object on the basis of a partial point cloud.

BACKGROUND

Machine or computer-based vision (commonly called "computer vision") is one of the most promising yet complex fields in industrial robotics. In order to enable a robot to recognize and, for example, grasp objects in space, it is generally necessary for the robot to estimate the 6D position of the object with sufficient accuracy (commonly called "6D pose estimation") and to conclude the overall shape of the object from the only partial vision information (commonly called "shape completion").

For position estimation or position determination, RGB-based, RGB-D-based, or depth-based approaches are typically used. In this case, most deep learning methods treat the position estimation as a regression problem. In view of the high costs of providing annotated or labeled training data, some approaches train the networks using true images and synthetic data.

RGB-based methods typically focus on the color information contained in the RGB image material captured by the robot. For example, "Implicit 3D orientation learning for 6D object detection from RGB images" (Martin Sundermeyer et al., European Conference on Computer Vision (ECCV), pp. 712-729, 2018) renders various views of objects and uses them as training data.

RGB-D methods utilize both RGB image data and depth image data as training data. For example, W-PoserNet (cf. "W-PoseNet: Dense correspondence regularized pixel pair pose regression," Zelin Xu et al., CoRR, arXiv:1912.11888 [cs.CV], 2019) generates a point cloud from RGB-D data in order to subsequently extract features therefrom.

In turn, depth-based methods generally do not utilize color information.

The point pair feature (PPF) algorithm known from the prior art is an example of a method for estimating the 6D position by a global model and local matching (cf. "Model globally, match locally: Efficient and robust 3D object recognition," B. Drost et al., Conference on Computer Vision and Pattern Recognition (CVPR), pp. 998-1005, 2010). One difficulty in position determination is the symmetry because, when rotating about the axis of symmetry, a symmetric object remains in the identical position or pose in relation to the camera, resulting in rotational ambiguities.

Three basic approaches can be applied for the representation of a 3D object in the environment: point cloud, voxels and meshes, which each have advantages and disadvantages.

In light of this, the technical object of the disclosure is to provide improved techniques for machine vision, in particular for the 6D position estimate and shape completion estimate of an object, which techniques at least partially overcome the disadvantages of the prior art.

SUMMARY

Embodiments of the disclosure provide an artificial neural network (KNN) having a novel encoder-decoder architecture. The KNN may be used to learn a generalized shape representation of the object in the embedding space in order to use an incomplete and/or erroneous observation of the object to predict or estimate the 6D object position thereof and to complete the shape thereof. In some embodiments, only one CAD model of the object is used to train the KNN so that additional labeled training data are not required. The encoder can predict the rotation in the embedding space spanned by the trained decoder from a synthetic partial point cloud as input. A translation estimation block may be used to estimate the translation in the object reference frame by using the predicted rotation. Some embodiments of the disclosure furthermore provide a novel loss function that allows symmetric object to be treated indifferently.

In one embodiment, the disclosure relates to a computer-implemented method for machine vision. The method may comprise generating (i.e., calculating or estimating), by an artificial neural network, a 6D position estimate of an object and a shape completion estimate of the object on the basis of a partial point cloud. The partial point cloud may comprise a set of 3D points that partially represent the object.

As a result, it is possible to estimate the 6D object position and the shape completion of an object by means of a single artificial neural network. The input for the artificial neural network is preferably merely a set of 3D points of a partial point cloud of the object.

The artificial neural network may be or may have been trained on training data which are based on digital geometry model data of the object, preferably exclusively on digital geometry model data of the object. The digital geometry model data of the object may be from at least one CAD model of the object. Here, at least one partial point cloud for use as training data can be generated from the digital geometry model data. On the one hand, this has the technical advantage that no annotated or labeled training data are required for the training of the artificial neural network. Moreover, the training is based exclusively on depth information, which is not prone to brightness and color variances in comparison to conventional image information.

The artificial neural network may comprise an encoder, and the method may furthermore comprise: generating, by the encoder, a rotation estimation of the object in the latent space on the basis of the partial point cloud. The encoder may comprise a PointNet++ architecture. The encoder may comprise a plurality of set abstraction layers, particularly preferably a plurality of set abstraction layers having different radii for extracting at least one local characteristic, and at least one further set abstraction layer for obtaining at least one global characteristic. The encoder may comprise a plurality of residual neural blocks or networks.

The artificial neural network may comprise a decoder, and the method may furthermore comprise: generating a canonical position correspondence estimation of the object and/or, by the decoder, one or more SDF values on the basis of the partial point cloud, and/or a or the rotation estimation, generated by the encoder, of the object in the latent space.

The encoder may comprise a DeepSDF architecture. In one aspect of the disclosure, a DeepSDF-based decoder may be developed to predict or estimate the shape of an object when viewed from various orientations, which may be accomplished by providing a transformation embedding code. The encoder may comprise a multilayer perceptron.

The artificial neural network may comprise a translation estimation network, and the method may furthermore comprise: generating, by the translation estimation network, a translation offset estimation in the canonical object space on the basis of a or the canonical position correspondence estimation of the object.

In another aspect, the method may furthermore comprise: acquiring data of the object using at least one depth sensor, and/or generating the partial point cloud from the captured data, preferably using an instance segmentation network, and/or outputting at least one control signal for an industrial robot to manipulate the object and/or to control the industrial robot based on the 6D position estimate and the shape completion estimate of the object. In this aspect, the method provides a direct connection to the physical world, namely, by acquiring sensor values on the input side and/or by actively controlling an industrial robot on the output side. Accordingly, in this aspect, the principles of the disclosure may be used in industrial automation technology, in particular robotics. For example, an industrial robot may manipulate, i.e., for example, grasp and precisely move, mount, or the like, the object based on the estimated 6D object position and the completed object shape, for example in the manufacture of a product, such as an e-bike motor.

The disclosure also relates to an artificial neural network for generating a 6D position estimate of an object and a shape completion estimate of the object, the artificial neural network being configured for use in a method as claimed in any of the preceding claims. In particular, the artificial neural network may have all or at least some of the constituents, components, functions, and/or properties described above, in particular the described encoder and/or decoder.

Furthermore, the disclosure provides a method for training an artificial neural network as described above. In one aspect, the method comprises training the artificial neural network using training data which are based exclusively on digital geometry model data of the object, in particular from at least one CAD model of the object. It is particularly preferred if the artificial neural network is trained exclusively using the at least one digital geometry model of the object or exclusively using depth data which can be obtained from the at least one digital geometry model of the object.

If the artificial neural network comprises an encoder and a decoder, it may be advantageous if the method comprises: training the decoder and training the encoder using the trained decoder.

The disclosure furthermore relates to an apparatus or a system for data processing, comprising means for carrying out any of the methods described above. For example, a corresponding apparatus or a corresponding system may have a memory for storing computer instructions and at least one processor communicatively connected to the memory, wherein the processor may be configured to carry out any of the methods described above when the computer instructions are executed.

Also provided is a computer program comprising instructions that, when the program is executed by a computer, cause the latter to carry out the method according to any embodiment disclosed herein.

BRIEF DESCRIPTION OF THE DRAWINGS

Non-limiting and non-exhaustive embodiments of the present disclosure are described below with reference to the following figures.

DETAILED DESCRIPTION

Completing the shape (commonly called "shape completion") and estimating the 6D position or pose (commonly called "6D pose estimation") of an object is a fundamental and highly complex task in the area of machine vision, in particular robot vision. Embodiments of the disclosure provide a method for machine vision, a corresponding artificial neural network (KNN) as well as a training method for such a KNN.

Figure 1:
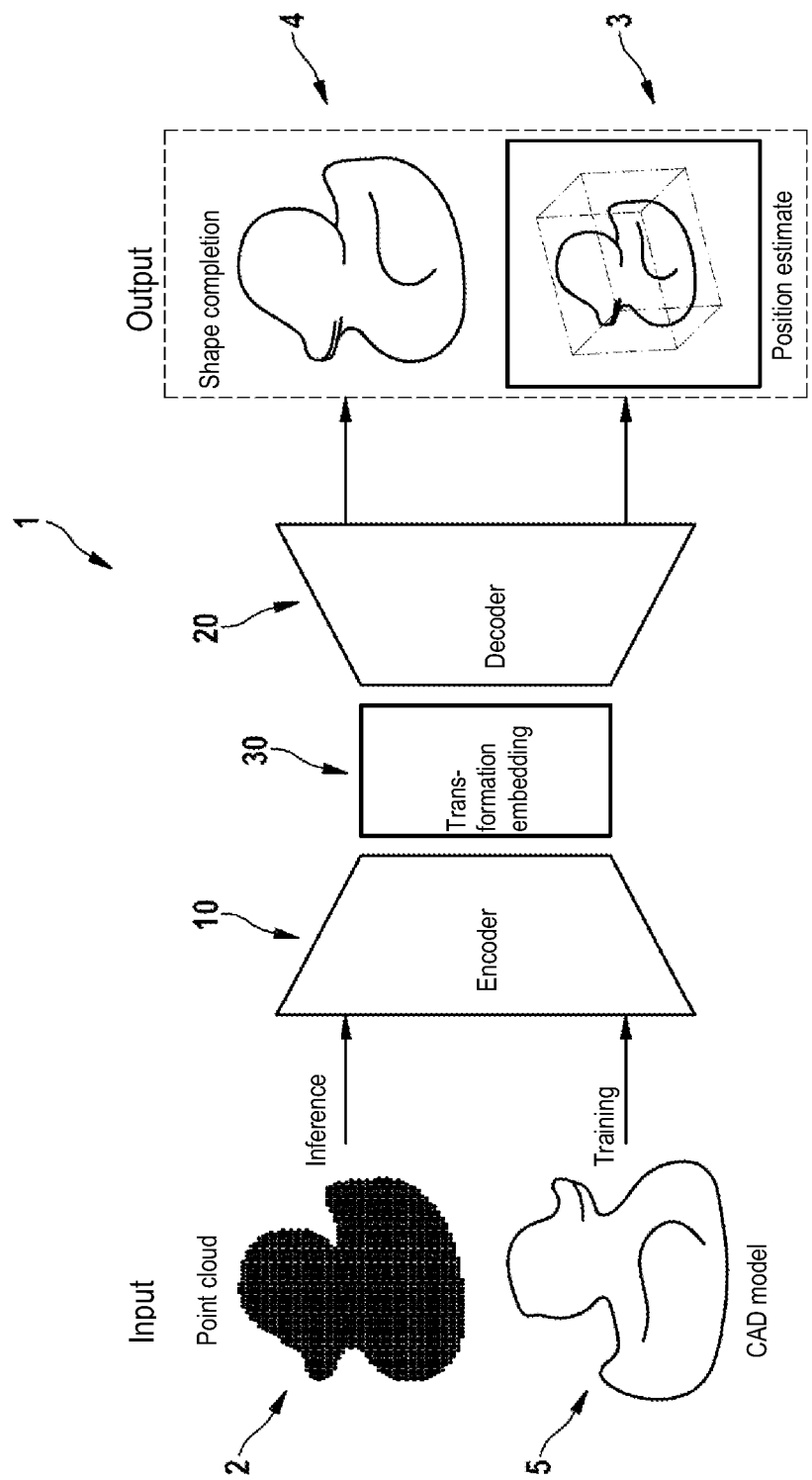
FIG. 1: A schematic overview of an artificial neural network according to an embodiment of the disclosure.

FIG. 1 shows the basic structure of a KNN according to an exemplary embodiment of the disclosure in the manner of an overview. The KNN 1 shown comprises a two-step encoder-decoder network having an encoder 10 and a decoder 20. In principle, the network can be understood as a rotation estimation block followed by a translation predictor in the canonical object space. In one embodiment, the network may learn the shape representation and correspondences of objects in various orientations in order to estimate the 6D pose. The decoder 20 may learn rotations in the embedding space and the signed distance function (SDF) of the object at various alignments. This makes it possible to complete the shape of the object and to use a shape-dependent loss function for the training of the decoder, which helps to treat symmetric objects indifferently.

Below, the KNN 1 from FIG. 1 is explained first within the framework of the 6D position estimation. The encoder 10 receives as input a partial point cloud 2 and estimates the rotation in the embedding space. The rotation embedding, the partial point cloud 2 and a one-hot vector representing the object type are used as input for the decoder 20, which estimates correspondences in order to estimate the rotation. The estimated correspondences may comprise a translation offset in relation to the actual correspondences. The correspondences are used as input for a translation predictor network (not shown in FIG. 1) in order to estimate the translation offset. Generally speaking, the exact correspondences to the partial point cloud 2 can thereby be learned in order to generate the 6D position estimation 3. The object embedding, the estimated rotation embedding, and the decoder 20 may also be used for shape completion 4. In an embodiment, by uniformly scanning points in a unit cube and estimating the associated SDF values by using the decoder 20 and the embeddings, a full mesh can be reconstructed, for example by using the marching cubes algorithm.

Figure 2:
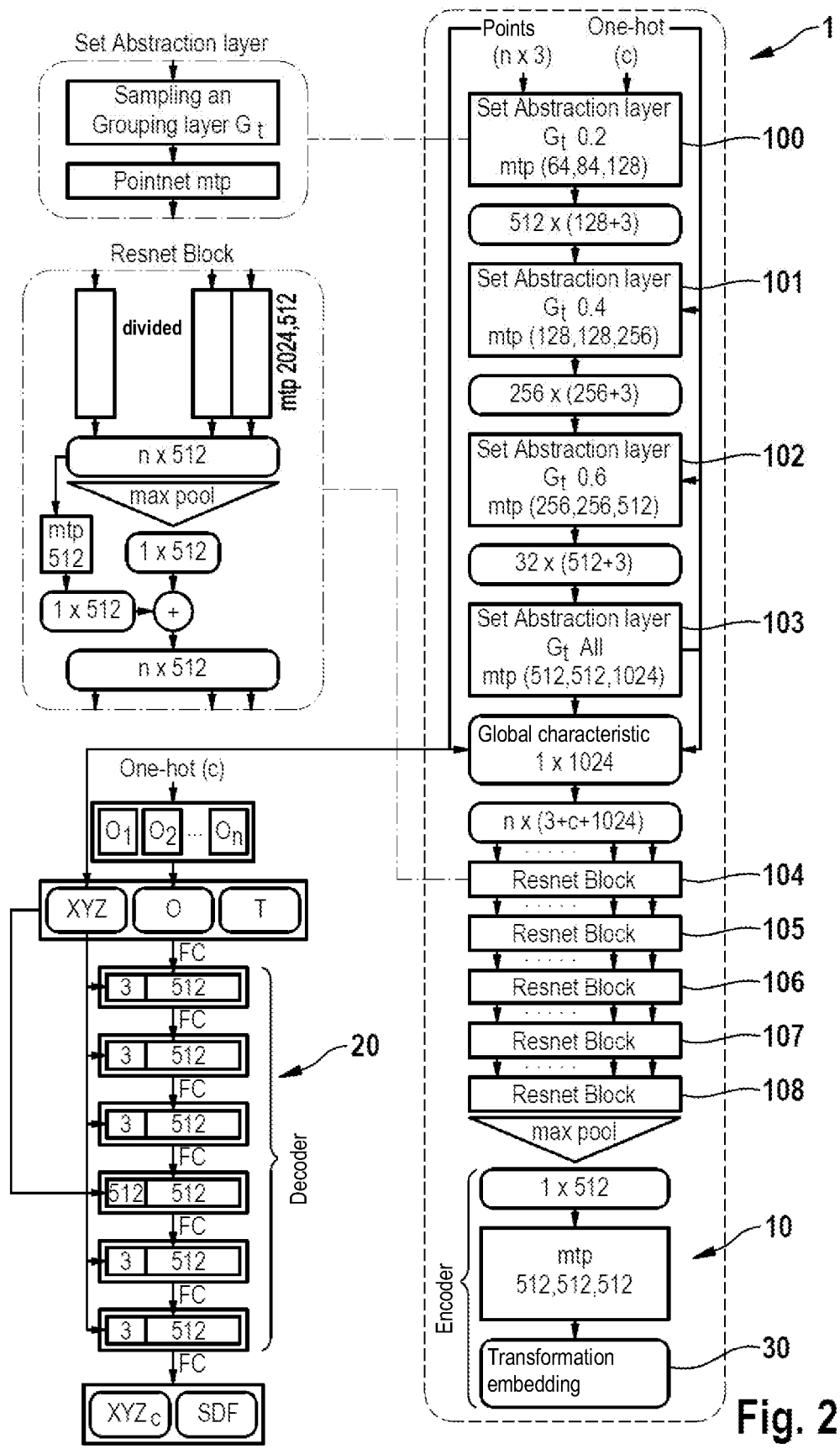
FIG. 2: A detailed view of an architecture according to an embodiment of the disclosure.

FIG. 2 shows a detailed view of an encoder-decoder architecture according to an embodiment of the disclosure. The architecture in the illustrated example comprises a point cloud-based encoder 10 and a multilayer perceptron as decoder 20. The point cloud 2 (cf. FIG. 1) and a one-hot vector are used as input for the encoder 10 and are propagated through the shown set abstraction layers (SALs) 100, 101, 102 having different radii, in order to extract local features, after which a global feature is calculated from all points in the fourth SAL 103. The global feature is attached to the point cloud using the one-hot vector and is passed through ResNet blocks 104-108 in order to extract the transformation embedding 30. The one-hot vector is used to extract a relevant object embedding, which then functions, along with each point of the point cloud 2, as input for the decoder 20. The decoder block 20 estimates the SDF values and the correspondences (XYZc).

In one embodiment, the decoder 20 is based on the DeepSDF approach (cf. "DeepSDF: Learning continuous signed distance functions for shape representation," Jeong Joon Park et al., Conference on Computer Vision and Pattern Recognition (CVPR), pp. 165-174, 2019), which includes an additional embedding space and correspondences for learning the alignment. This makes it possible to simultaneously perform the shape completion and the position estimation. In one embodiment, two different embeddings are used, one with reference to the shape of the object and another with reference to the alignment or orientation of the object. In addition to estimating SDF values, the decoder 20 may also estimate the correspondences of a transformed input point to the canonical view. In one embodiment, the decoder 20 is trained as an auto decoder, i.e., without an encoder, wherein the embedding vectors are optimized along with the weights during the training.

In one exemplary embodiment, N embedding vectors having a dimension of 384 for N objects are sampled from N(0, 1/384), hereinafter referred to as object embedding. Similarly, K embedding vectors for K rotations having a dimension of 128 are sampled from N(0, 1/128), hereinafter referred to as transformation embedding. Although the embedding vectors are randomly sampled, both embeddings are optimized during decoder training. In one embodiment, K quaternions are randomly sampled in order to learn objects in K alignments.

Each transformation embedding vector, $T_K$, is assigned to a rotation, $R_K$. Similarly, each object embedding vector, $O_n$, is assigned to the n-th object. Let $x_n$ be a 3D point in the n-th object. The 3D point rotated about the k-th rotation, $R_K$, in the n-th object is concatenated with the associated object embedding $O_n$ and transformation embedding $T_K$ in order to form the input vector. The network, $D_\theta$, receives the input vector and estimates the SDF values $s_n^k$ and the associated 3D coordinate $y_n^k$ in the canonical alignment.

$$R_k=\phi(T_k), x_n^k=R_k \cdot x_n$$

$$s_n^k, y_n^k=D_\theta(x_n^k, O_n, T_k) \quad (1)$$

The decoder 20 according to embodiments of the disclosure may have interesting properties. For example, by selecting a transformation embedding and changing the object embedding by using the estimated SDF values, various shapes may be reconstructed at the same alignment. This shows that the principles of the disclosure may unweave the embedding spaces of objects and transformations. This is an advantageous property since the decoder 20 according to embodiments of the disclosure estimates only transformation embedding.

In some embodiments, the decoder 20 spans the continuous rotation space, even though it was trained using K discrete rotations. It is possible to choose an embedding vector and to find its nearest neighbors in the trained embeddings, for example by using the L2 distance. By using the same object embedding and by linearly varying the transformation embedding from one transformation embedding to the other, the objects can be reconstructed, wherein the spanned rotations are a convex combination of two quaternions corresponding to the two transformation embedding vectors.

In one embodiment, the encoder 10 extracts characteristics or features from the partial point cloud 2 and estimates the transformation in the embedding space 30. As already mentioned above, in one embodiment, SALs based on PointNet++ and a ResNet-based PointNet are used to process the point cloud (see FIG. 2). By using SALs, local characteristics can be extracted with three different radii and propagated to one or more further layers in order to obtain a global characteristic. As already described, the global characteristic can be attached to all points of the point cloud and entered into the ResNet-based PointNet in order to estimate the transformation embedding 30. The use of both local and global characteristics allows for a particularly accurate estimation of the orientation of the object.

Unlike the decoder 20, which in one embodiment receives a single 3D point as input, the encoder 10 in one embodiment takes a number or a set of 3D points as input. The partial point cloud 2 and a one-hot vector representing the object are entered into the encoder 10 in order to estimate the transformation embedding 30. The transformation embedding 30, along with the object embedding and 3D points with the same transformation, is entered into the decoder 20 as a partial input point cloud. As output, the decoder 20 generates the SDF values and the correspondences to the non-canonical point cloud. The point cloud $P_n$, which corresponds to the n-th object, is rotated by the k-th rotation $R_k$ in order to generate a rotated point cloud $P_n^k$. The rotated point cloud, along with a one-hot vector $OH_n$ is sent into the network in order to estimate the transformation embedding $T_k$ as follows:

$$P_n^k=(R_k \cdot P_n), T_k=E_\theta(P_n^k, OH_n) \quad (2)$$

Figure 3:
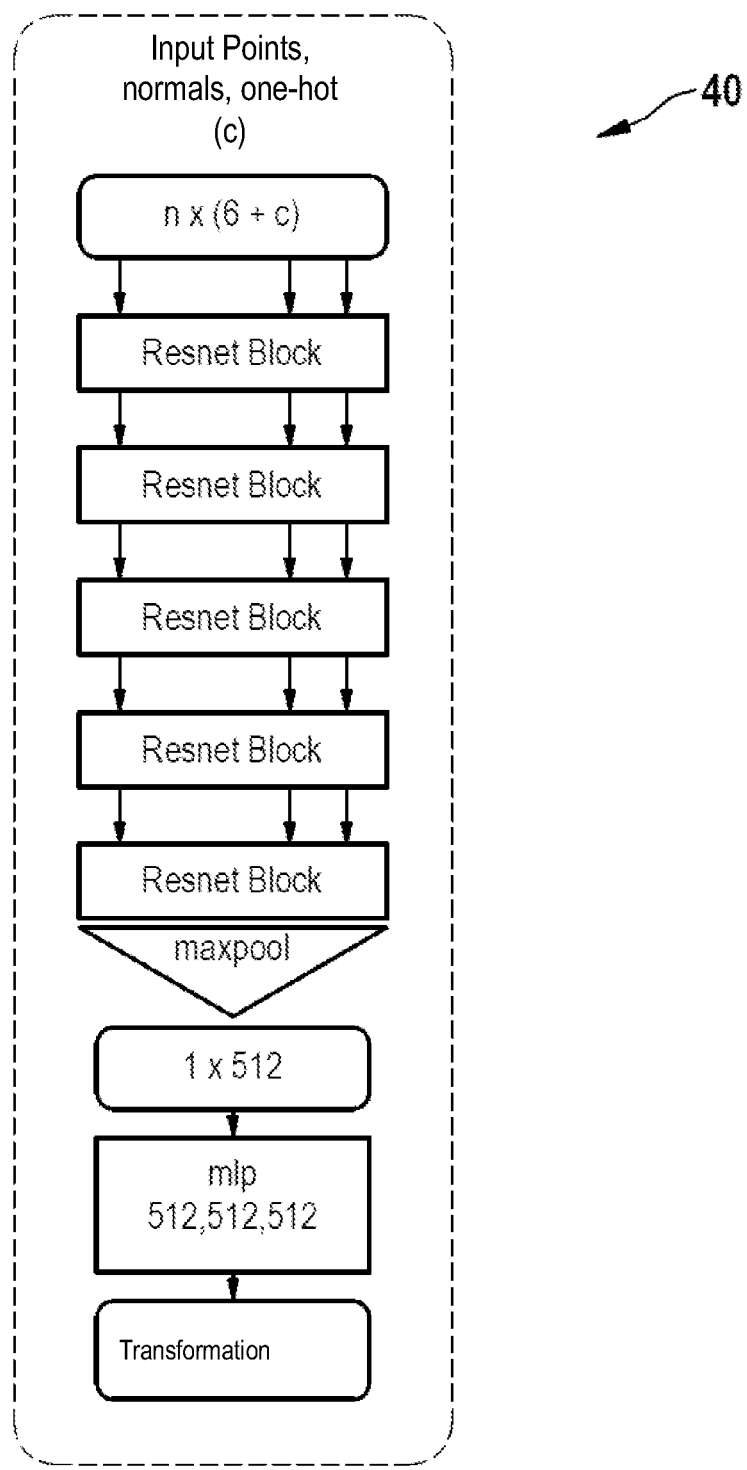
FIG. 3: A detailed view of a translation predictor according to an embodiment of the disclosure.

In one embodiment, a translation predictor 40 is used to estimate the translation offset in the canonical object space. FIG. 3 shows an embodiment of the predictor 40. The network takes the estimated correspondences of the decoder 20, their normals, and the one-hot vector as inputs in order to estimate the translation offset with respect to the actual correspondences. The normals at each point are used by the network to be able to better estimate the translation since the direction of the normals determines the direction of the translation. Since the network operates in the canonical object space in some embodiments, there is no ambiguity in the case of symmetric objects. The 3D correspondences, along with the one-hot vector $OH_n$ and the point cloud normals, $N_n^k$, are used as input to this block in order to estimate the translation offset $t_n^k$ as follows:

$$t_n^k=T_\theta(Y_n^k, N_n^k, OH_n) \quad (3)$$

In some embodiments of the disclosure, loss functions may be used as described below. As already described above, in one embodiment, the decoder 20 obtains a concatenated vector having a 3D point and embedding vector, in order to estimate SDF values and associated 3D coordinates in the canonical space. In this case, the loss functions of shape loss, $L_S$, and correspondence loss, $L_C$, can be formulated in order to estimate accurate SDF values and correspondences to the canonical orientation. Let x be a single 3D point and X a number of 3D points. Furthermore, let the notation for the n-th object rotated by the k-th rotation be as follows: Let reference SDF values and estimated SDF values be respectively denoted by $\hat{S}_n^k$ and $S_n^k$. Let the reference correspondence coordinates and the estimated correspondence coordinates be respectively denoted by $\hat{Y}_n^k$ and $Y_n^k$.

The total decoder loss, $L_D$, for use in training the decoder 20 using scaling factors, $\oplus$, $\beta$, is calculated as follows:

$$L_S = \sum_{n,k} \left\| S_n^k, \hat{S}_n^k \right\|_1, L_C = \sum_{n,k} \left\| Y_n^k, \hat{Y}_n^k \right\|_1 \quad (4)$$

$$L_D = \alpha L_S + \beta L_C$$

With respect to the encoder 10, the partial point cloud 2 of the n-th object, transformed using the k-th rotation, $P_n^k$, and a one-hot vector, $OH_n$, are used as input for the encoder 10 in order to estimate transformation embedding, $T_k$. The transformation embedding along with the object embedding, $O_n$, are concatenated with each point of the point cloud, $X_n^k$, and are used as input for the decoder in order to estimate the SDF values, $S_n^k$, and the 3D point correspondences, $Y_n^k$.

In one embodiment, the same SDF loss function, $L_S$, as for the training of the decoder 20 is used for the encoder 10. This is because SDF is not influenced by symmetry since it is an inherent property of the shape when symmetries are implicitly considered.

The correspondence loss, $L_c^{as}$, for asymmetric objects (AS) corresponds in one embodiment to the loss used in the training of the decoder 20.

$$L_C^{as} = \sum_{n \in AS, k} \left\| Y_n^k, \hat{Y}_n^k \right\|_1 \quad (5)$$

$$L_C^{as} = \sum_{n \in AS, k} \left\| Y_n^k, \hat{Y}_n^k \right\|_1$$

Symmetric objects that have symmetry when rotating by discrete angles are generally referred to as discretely symmetric. Such objects in one embodiment are treated by using the transformer loss, $L_c^{ds}$, as proposed in "Pix2Pose: Pixelwise coordinate regression of objects for 6D pose estimation" (Kim Park et al., International Conference on Computer Vision (ICCV), pp. 7667-7676, October 2019). The transformer loss calculates the loss between the estimated 3D correspondences and the reference point correspondences in all possible rotation configurations in which the shape is symmetric and considers the minimum. Let $R_d$ be a rotation matrix for D symmetric configurations for transforming the shape to another alignment without changing the perceived shape. The correspondence loss, $L_c^{ds}$, for discretely symmetric objects (DS) with D symmetric configurations can then be calculated as follows:

$$L_C^{ds} = \sum_{n \in DS, k} \min_{d \in D} \left( \left\| Y_n^k, R_d \cdot \hat{Y}_n^k \right\|_1 \right) \quad (6)$$

Symmetric objects that are fully symmetric about an axis are generally referred to as continuously symmetric. Here, the estimated correspondences can be rotated by any angle about the axis of symmetry and still be valid. This results in endless possibilities if the loss is to be calculated for each valid configuration. While other approaches ignore rotations about the axis of symmetry during training, attempts are made in embodiments of the disclosure to estimate a rotation about the axis of symmetry that minimizes the distance between the correspondences. The correspondence loss, $L_c^{cs}$, for continuously symmetric objects (CS) can then be estimated by restricting the rotation to a class of rotations about the axis of symmetry, Z, and calculating the minimum L1 distance between the correspondences as follows:

$$L_C^{CS} = \sum_{n \in CS, k} \min_{r \in Z} \left\| \left( Y_n^k, r \cdot \hat{Y}_n^k \right) \right\|_1 \quad (7)$$

The rotation matrix, r, may be estimated by a singular-value decomposition on the basis of a 2D vector by removing the z coordinate from 3D correspondence points. In one embodiment, a further loss amount is used so that the transformation embedding $T_k$ remains close to the transformation embedding space learned by the decoder. Let the transformation embeddings optimized during the training of the decoder be denoted by $\hat{T}$. We calculate the chamfer distance between an estimated transformation embedding and K transformation embeddings $\hat{T}$ optimized during the training of the decoder. The embedding chamfer loss $L_{ecl}$ can be estimated as follows:

$$L_{ecl} = \sum_k \min_{l \in K} \left\| (T_k, \hat{T}_l) \right\|_1 \quad (8)$$

The total encoder loss, $L_E$, for use in training the encoder 10 can then be calculated using scaling factors $\alpha$, $\beta$, and $\gamma$ as follows:

$$L_E = \alpha L_s + \beta (L_c^{cs} + L_c^{ds} + L_c^{as}) + \gamma L_{ecl} \quad (9)$$

With regard to the translation predictor 40, it has already been explained above that in one embodiment, it receives the one-hot vector $OH_n$, estimated correspondences $Y_n^k$, and point cloud normals $N_n^k$ of the correspondences as input in order to calculate the translation offset, $t_n^k$. The translation predictor may be trained using the loss function by using the reference translation offset, $\hat{t}_n^k$:

$$L_T = \sum_{n,k} \left\| (t_n^k, \hat{t}_n^k) \right\|_1 \quad (10)$$

In one embodiment, the estimated position may furthermore be refined by using known methods, for example, the point-to-point iterative closest point (ICP) algorithm. The original mesh can be transformed using the estimated position. The visible points of the transformed mesh can be estimated from a virtual camera. In one embodiment, ICP is applied between the visible point cloud and the original point cloud in order to refine the estimated position.

Unlike known approaches in which the encoder and decoder are typically trained together, in an embodiment of the disclosure, the decoder 20 is trained first and the encoder 10 is then trained using the already pretrained decoder 20. This makes it possible to use different loss functions for training the respective components, which may be particularly advantageous. For example, the decoder 20 learns the rotation and shape representation of the object in the embedding space independently of the symmetry of the object. However, in the context of the disclosure, different loss functions for symmetric objects may be used in order to manage position ambiguities during training of the encoder 10.

In summary, some embodiments of the disclosure offer the following technical advantages:

On the basis of the signed distance function (SDF), the KNN can learn a representation or embedding of the object.

The KNN may implicitly estimate the 6D position of the object based on a learned generalized embedding vector for each object class.

The KNN is preferably only trained by using CAD models, i.e., unlike in the prior art, no additional annotated or labeled training data are required.

The separable encoder-decoder architecture allows for efficient handling of symmetric objects.

Experimental evaluations of embodiments of the disclosure yielded promising results for both symmetric and asymmetric objects by using the LineMOD, Occlusion LineMOD, and T-LESS datasets.

What is claimed is:

1. A computer-implemented method for machine vision, comprising:
   acquiring data of an object using at least one depth sensor;
   generating a partial point cloud from the acquired data, the partial point cloud including a set of 3D points at least partially representing the object;
   generating, using an artificial neural network, a 6D position estimate of the object and a shape completion estimate of the object based on the partial point cloud, the artificial neural network having been trained using training data which are based exclusively on digital geometry model data of the object from at least one CAD model of the object; and
   controlling a robot based on the 6D position estimate and the shape completion estimate of the object.

2. The method as claimed in claim 1, wherein the artificial neural network comprises an encoder, and the method further comprises:
   generating, by the encoder, a rotation estimation of the object in a latent space based on the partial point cloud, wherein the encoder comprises a PointNet++ architecture.

3. The method as claimed in claim 2, wherein the encoder comprises (i) a plurality of set abstraction layers having different radii for extracting at least one local characteristic, and (ii) at least one further set abstraction layer for obtaining at least one global characteristic.

4. The method as claimed in claim 2, wherein the encoder comprises a plurality of residual neural blocks.

5. The method as claimed in claim 1, wherein the artificial neural network comprises an encoder and a decoder, and the method further comprises:
   generating (i) a canonical position correspondence estimation of the object, by the decoder, (ii) one or more signed distance field values ("SDF values") based on the partial point cloud, and/or (iii) a rotation estimation, by the encoder, of the object in a latent space.

6. The method as claimed in claim 5, wherein the decoder comprises a DeepSDF architecture.

7. The method as claimed in claim 5, wherein the decoder comprises a multilayer perceptron.

8. The method as claimed in claim 1, wherein the artificial neural network comprises a translation estimation network and the method further comprises:
   generating, by the translation estimation network, a translation offset estimation in a canonical object space based on a canonical position correspondence estimation of the object.

9. The method as claimed in claim 1, the generating the partial point cloud further comprising:
   generating the partial point cloud from the acquired data using an instance segmentation network.

10. The method as claimed in claim 1, wherein a computer program comprises instructions that, when the computer program is executed by a computer, cause the computer to carry out the method.

11. The method as claimed in claim 1, the controlling the robot further comprising:
   outputting at least one control signal for the robot to manipulate the object based on the 6D position estimate and the shape completion estimate of the object.

12. The method as claimed in claim 1, wherein the robot is an industrial robot.

13. A machine vision apparatus, comprising:
   at least one depth sensor configured to acquire data of an object; and
   at least one processor configured to:
      generate a partial point cloud from the acquired data, the partial point cloud including a set of 3D points at least partially representing the object;
      generate, using an artificial neural network, a 6D position estimate of the object and a shape completion estimate of the object based on a partial point cloud, the artificial neural network having been trained using training data which are based exclusively on digital geometry model data of the object from at least one CAD model of the object; and
      control a robot based on the 6D position estimate and the shape completion estimate of the object.

14. A method for training an artificial neural network of a machine vision system, the method comprising:
   providing training data which are based exclusively on digital geometry model data of an object from at least one CAD model of the object; and
   training, using the training data, the artificial neural network to generate a 6D position estimate of the object and a shape completion estimate of the object based on a partial point cloud.

15. The method as claimed in claim 14, wherein the artificial neural network comprises an encoder and a decoder, the method further comprising:
   training the decoder; and
   training the encoder using the trained decoder.

* * * * *